United States Patent
Bookbinder et al.

(10) Patent No.: US 9,878,272 B2
(45) Date of Patent: Jan. 30, 2018

(54) POROUS INORGANIC MEMBRANES AND METHOD OF MANUFACTURE

(75) Inventors: Dana Craig Bookbinder, Corning, NY (US); Gary S Calabrese, Corning, NY (US); Yunfeng Gu, Painted Post, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 167 days.

(21) Appl. No.: 13/115,349

(22) Filed: May 25, 2011

(65) Prior Publication Data

US 2011/0293917 A1     Dec. 1, 2011

Related U.S. Application Data

(60) Provisional application No. 61/349,357, filed on May 28, 2010.

(51) Int. Cl.
*B01D 29/05* (2006.01)
*B01D 67/00* (2006.01)
*B01D 71/02* (2006.01)

(52) U.S. Cl.
CPC ......... *B01D 29/05* (2013.01); *B01D 67/0046* (2013.01); *B01D 67/0058* (2013.01); *B01D 67/0095* (2013.01); *B01D 71/02* (2013.01); *B01D 71/024* (2013.01); *B01D 71/025* (2013.01); *B01D 71/027* (2013.01); *B01D 71/028* (2013.01); *B01D 2325/04* (2013.01); *Y10T 428/249981* (2015.04)

(58) Field of Classification Search
CPC .................................................. B01D 67/0046
USPC ................... 427/243–245; 210/506; 502/439
See application file for complete search history.

(56) References Cited

U.S. PATENT DOCUMENTS

| | | | |
|---|---|---|---|
| 3,890,219 A | 6/1975 | McCoy et al. | |
| 4,451,583 A | 5/1984 | Chesler | |
| 4,791,151 A | 12/1988 | Kowalski et al. | ............ 523/201 |
| 5,589,116 A | 12/1996 | Kojima et al. | |
| 5,605,628 A | 2/1997 | Davidson et al. | |

(Continued)

FOREIGN PATENT DOCUMENTS

| | | |
|---|---|---|
| CN | 1454871 A | 11/2003 |
| DE | 3835807 A1 | 5/1989 |

(Continued)

*Primary Examiner* — Alex A Rolland
(74) *Attorney, Agent, or Firm* — Jakub M. Michna

(57) ABSTRACT

A method is provided for making a porous inorganic membrane by using a mixture of an inorganic material, organic polymer particles and a solvent to form a slurry, the particles being non-spherical, distributing the slurry onto a surface, drying the slurry to remove the solvent and firing the dried slurry to produce the porous inorganic membrane. Examples of organic polymer particles include particles of acrylic. A substrate with a porous inorganic membrane disposed on the substrate is also provided, the inorganic membrane having an average thickness of from about 0.5 micron to about 30 microns, a porosity of from about 30% to about 65%, a median pore size (d50) of from about 0.01 micron to about 1 micron, and a value of (d90−d10)/d50 less than about 2, as measured by mercury porosimetry. An example of a substrate includes an inorganic porous support.

21 Claims, 10 Drawing Sheets

(56) References Cited

U.S. PATENT DOCUMENTS

| | | |
|---|---|---|
| 6,136,029 A | 10/2000 | Johnson et al. |
| 6,403,158 B1* | 6/2002 | Corman |
| 6,573,208 B1* | 6/2003 | Soria et al. .................. 501/95.1 |
| 6,713,088 B2 | 3/2004 | Lodyga et al. |
| 2003/0137071 A1 | 7/2003 | Noguchi et al. |
| 2003/0146538 A1 | 8/2003 | Sambrook et al. |
| 2005/0046063 A1 | 3/2005 | Toda et al. |
| 2007/0232707 A1 | 10/2007 | Benitsch et al. |
| 2008/0022644 A1 | 1/2008 | Derosa |
| 2008/0213725 A1* | 9/2008 | Adilstam et al. .......... 433/201.1 |
| 2008/0237919 A1 | 10/2008 | Liu et al. |
| 2008/0299377 A1* | 12/2008 | Gu et al. .................... 428/307.7 |

FOREIGN PATENT DOCUMENTS

| | | |
|---|---|---|
| EP | 0586102 A1 | 3/1994 |
| EP | 1329229 A1 | 7/2003 |
| JP | 2002-282629 | 10/2002 |
| WO | 2009/014775 | 1/2009 |

\* cited by examiner

POROUS INORGANIC MEMBRANES AND METHOD OF MANUFACTURE

CROSS-REFERENCE TO RELATED APPLICATION

This application claims the benefit of priority under 35 U.S.C. §119 of U.S. Provisional Application Ser. No. 61/349,357, filed on May 28, 2010, the content of which is relied upon and incorporated herein by reference in its entirety.

BACKGROUND

The present disclosure relates generally to porous inorganic membranes and methods for preparing inorganic membranes and coatings, and particularly to porous inorganic membranes and coatings having uniform pore size distribution.

Porous inorganic membranes have been widely used for industrial liquid filtration, and have recently been investigated for gas-particulate separations, pervaporation (combination of membrane permeation and evaporation), gas separations and catalytic reactions.

In known coatings currently available, the pore structures are generally formed from particle packing during drying and firing process. This results in limited porosity and variation in the pore size distribution.

SUMMARY

In one aspect, the present disclosure provides a method for making a porous inorganic membrane comprising the steps of mixing an inorganic material, organic polymer particles (such as acrylic, e.g in the form of an acrylic emulsion, and the acrylic emulsion comprises acrylic particles) and a solvent to form a slurry, the particles being non-spherical, distributing the slurry onto a surface, drying the slurry to remove the solvent and firing the dried slurry to produce the porous inorganic membrane.

In another aspect, the present disclosure provides a method for producing a porous support with a porous inorganic coating comprising the steps of mixing an inorganic material, an acrylic emulsion and a solvent to form a slurry, wherein the acrylic emulsion comprises acrylic particles, the particles being non-spherical, coating the porous support with the slurry, drying the slurry on the porous support to remove the solvent and firing the dried slurry on the porous support to produce the porous support with the porous inorganic coating. In another aspect, a substrate with a porous inorganic membrane disposed on the substrate is disclosed herein, the inorganic membrane having an average thickness of from about 0.5 micron to about 30 microns, and in some embodiments from about 1 micron to about 10 microns, a porosity of from about 30% to about 65%, a median pore size (d50) of from about 0.01 micron to about 1 micron, and a value of (d90−d10)/d50 less than about 2, as measured by mercury porosimetry; the substrate may be an inorganic porous support. Thus, present disclosure provides a porous inorganic membrane having a high porosity and uniform pore size distribution, as well as pore size, to help provide better separation efficiency, and/or better permeability and thus low backpressure.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
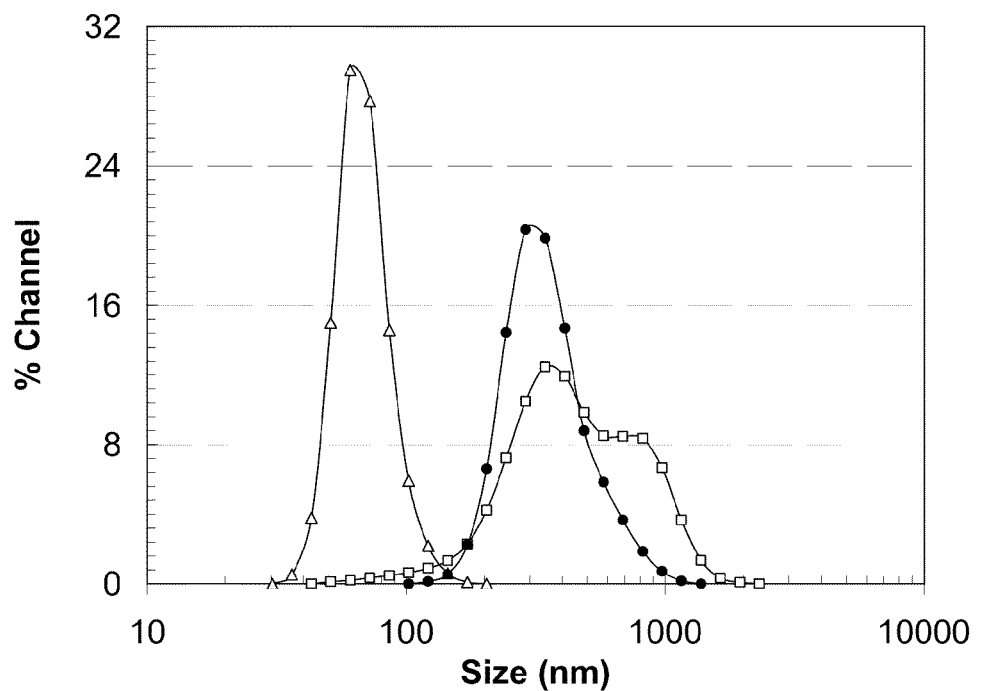
FIG. 1 is a graph showing the particle size distribution of pore formers and alumina.

Broadly, a method is disclosed herein for making a porous inorganic membrane that, for example, can be used in liquid filtration, gas separation, diesel particulate filters or gasoline particulate filters. The method for making the porous inorganic membrane may comprise the steps of mixing an inorganic material, organic polymer particles (such as an acrylic in the form of an acrylic emulsion) and a solvent to form a slurry. The slurry may be distributed onto a surface and dried to remove the solvent. The dried slurry may then be fired to produce the porous inorganic membrane. The acrylic emulsion may comprise acrylic polymers that act as pore formers. The acrylic emulsion may be used a pore former and may comprise acrylic polymers. The organic polymer particles, such as acrylic polymers, may be spherical or non-spherical. The porous inorganic membrane may be distributed onto a porous support to form a thin coating on that support. The use of organic polymer particles such as acrylic polymers as pore formers allows for controlled pore size distribution. The distribution may either by single modal or bi-modal.

In some presently disclosed embodiments, an acrylic emulsion comprising acrylic polymers may be used as a pore former. The acrylic emulsion may comprise acrylic polymers where the acrylic polymers are either spherical or non-spherical in shape. A non-limiting example of an acrylic emulsion having spherical acrylic polymers is RHOPLEX™ B-85 acrylic emulsion (Dow Chemical Co.). In some embodiments the acrylic polymers are non-spherical in shape. A non-limiting example of an acrylic polymer that is non-spherical is a multi-lobed acrylic polymer. Multi-lobed acrylic polymers are well known in the art and commercially available. RHOPLEX™ MULTILOBE™-400 acrylic binder (Dow Chemical Co.) is one example of a multi-lobed acrylic polymer. The number of lobes of the multi-lobed acrylic polymer may be from at least 2. In some embodiments, the number of lobes may be from about 2 to about 8. Other embodiments of non-spherical pore formers include materials that are decomposed by oxidation, such as organic polymers like cellulosic, styrene, urethane, and polyolefin structures, as well as activated carbon, and non-activated carbon. A non-spherical pore former can comprise non-spherical pore former particles comprising a first plurality of co-planar lobes or arms, and may optionally include one or more lobes or arms which are not coplanar with the first plurality of co-planar lobes or arms; thus, in some embodiments, the centers of each of the first plurality of co-planar lobes or arms lie substantially in a first plane, and the centers of one or more lobes or arms substantially outside the first plane; in some embodiments, the non-spherical pore former comprises non-spherical pore former particles, each particle having lobes or arms that are disposed in a common plane. While not wishing to be bound by theory, it is believed that the multi-lobed acrylic polymers increase the porosity of a porous inorganic membrane with a single modal pore distribution because the lobes, or arms, of the polymer may touch and therefore, after being burned out, connect the pores together.

The amount of acrylic emulsion in the slurry may be from about 10 vol % to about 80 vol % of total inorganic solids and polymers. Alternatively, the amount of acrylic emulsion in the slurry may be from about 20 vol % to about 60 vol % of total inorganic solids and polymers. The amount of both the spherical and non-spherical acrylic polymer emulsions are linearly proportional to the porosity of the porous inorganic membrane. However, the spherical and non-spherical acrylic polymers differ in pore size distribution. At low concentrations, both the spherical and non-spherical have a single modal pore size distribution. However, as the concentration of increases, the spherical acrylic polymer produces a porous inorganic membrane having a bi-modal pore size distribution, while the non-spherical remains single modal. In some embodiments the porous inorganic membrane has a pore size distribution as measured by mercury porosimetry comprising a mono-modal distribution wherein (d90–d10)/d50 is less than about 2 and the pores having a size of d90 or less comprise about 90% of the total pore volume, the pores having a size of d50 or less comprise about 50% of the total pore volume and the pores having a size of d10 or less comprise about 10% of the total pore volume.

In some presently disclosed embodiments, the inorganic materials can be any combination of inorganic components that, upon firing, can provide a primary sintered phase composition. The inorganic ceramic-forming ingredients may be cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate (such as zeolite), borosilicate, soda barium borosilicate or combinations of these, as well as others. Combinations of these materials may be physical or chemical combinations, for example, mixtures or composites, respectively. In some embodiments, the inorganic material may be alumina or cordierite. The inorganic material and the acrylic emulsion may be mixed together with a solvent to form a slurry. The solvent may be aqueous based, which may normally be water or water-miscible solvents, or organically based. Typically, the amount of aqueous solvent is from about 50% by weight to about 95% by weight. The slurry may also comprise additional materials such as, but not limited to, a dispersant, a binder, an anti-cracking agent, an anti-foaming agent, or combinations thereof.

In other embodiments presently disclosed, the method comprises distributing the slurry onto a surface. The surface may be a temporary template form where the porous organic membrane is removed before use, or it may be a support where the slurry is coated onto the surface of the support. Temporary templates may be any material that allows for the facile removal of the porous inorganic membrane from the template. Non-limiting examples may be plastic or glass, such as petri dishes. The supports to be coated may comprise any desired material that the porous inorganic membrane will bind to, such as porous ceramics. In some embodiments, the porous support may be a ceramic comprising cordierite, alpha-alumina, mullite, aluminum titinate, titania, zirconia, ceria or combinations thereof. The support may have convenient size and shape, depending on the use of the coated support. In some embodiments, the support is a honeycomb monolith, which may be used in any number of applications, such as catalytic, adsorption, electrically heated catalyst, filters such as diesel particulate filters, molten metal filters, etc.

The slurry may be distributed onto the surface by any means known in the art including, but not limited to, dip coating, pouring or spraying. In some embodiments, the support may be submerged in the slurry, removed, and drained of excess slurry. After the slurry is deposited onto the surface, the slurry is dried to remove the solvent. The slurry may be dried under ambient temperature and humidity. Alternatively, heat may be applied to dry the slurry. In some embodiments, the slurry is dried at a temperature of from about 25° C. to about 120° C. If desired, the slurry may be dried under conditions where the atmosphere and humidity are controlled. In some embodiments, the slurry may be dried in an environment of air or nitrogen gas at a humidity of from about 60% to 90%. The increased humidity allows the solvent to be removed, but inhibits cracking and spalling of the slurry. If the slurry is distributed onto a temporary template, it may be removed after drying but before firing.

After drying, the slurry may be fired to form the final porous inorganic membrane. Firing of the dried slurry hardens the membrane and also removes the acrylic polymer pore former, resulting in a porous membrane. Firing conditions are well known in the art and the skilled artisan can determine the correct conditions for the porous inorganic membrane being made without undue experimentation. In some embodiments, the dried slurry is fired for about 20 hours to about 45 hours at a temperature of about 1100° C. to about 1400° C.

The porous inorganic membrane may be selected based on properties of both support and membrane material. If the porous inorganic membrane is being applied to a porous support having a plurality of channels, such as with a honeycomb monolith, a thin membrane may be preferred to avoid potential cracking issues. In some embodiments, the thickness may be from about 0.5 micron to about 30 microns. The thickness of the membrane is controlled by the amount of slurry distributed onto the surface. The thickness may also depend on the surface or support used. If the porous inorganic membrane is being applied to a porous support have a plurality of channels, such as with a honeycomb monolith, a thin coating may be preferred so as not to block any channels. Alternatively, if the porous inorganic membrane is to be free standing, a thicker membrane may be desired for ease of handling. In some embodiments, the thickness may be from about 1 micron to about 10 microns.

The porosity of the porous inorganic membrane may be controlled by the amount of acrylic emulsion that is added to the slurry. As there is a linear relationship between the amount of acrylic emulsion added and the final porosity, the amount of acrylic emulsion required to give the desired porosity may be calculated without undue experimentation. In some embodiments, the porous inorganic membrane has a porosity of from about 20% to about 80% or, alternatively, a porosity of from about 30% to about 65%.

EXAMPLES

The following non-limiting examples are provided for further illustration.

Example 1

Deposition of Porous Alumina Membranes without Use of Pore Former

An alumina slurry comprised of 8 wt. % alumina was made by mixing alumina, Tiron and deionized water. The alumina was AKP30 from Sumitomo Chemical with a mean particle size of 0.2-0.3 μm. The particle size distribution as measured by a Nanotrac Particle Size Analyzer (Microtrac Inc., Montgomeryville, Pa.) is shown in the line connecting the solid circles in FIG. 1. Tiron (4,5-Dihydrony-1,3-benzenedisulfonic acid disodium salt) was used as a dispersant. 0.018 g of Tiron was added in a beaker containing 69 g of deionized water. When the Tiron was completely dissolved, 60 g of alumina was added. After ball-milling overnight, the slurry was poured through a fine screen, followed by degassing for 1 hour with a vacuum pump.

The alumina slurry was poured down into a Petri dish. After drying at 120° C. overnight, the resulted cake layer was scratched off the dish, and fired at 1150° C. for 2 h with a heating and cooling rate of 1° C. per minute.

Figure 2:
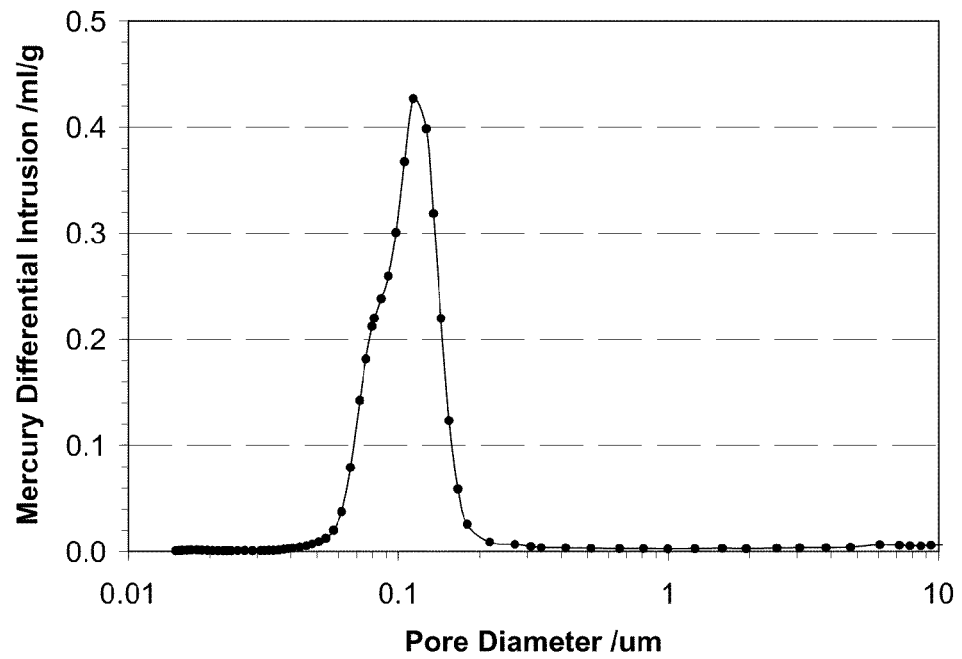
FIG. 2 is a graph showing the pore size distribution of an alumina membrane without the addition of a pore former.
Figure 3:
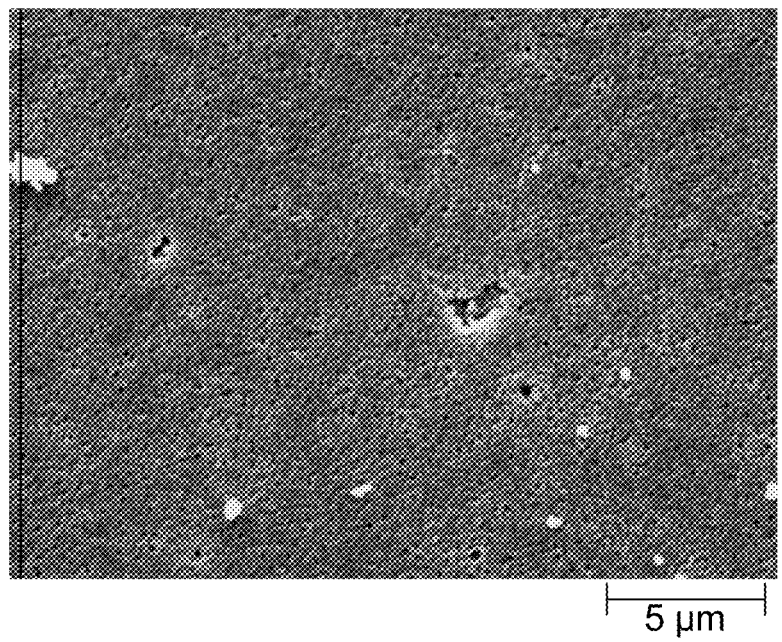
FIG. 3 is a scanning electron micrograph image of the surface morphology of the alumina membrane of FIG. 2.

The fired unsupported alumina membrane was characterized by Hg porosimetry and scanning electron microscopy (SEM). FIG. 2 shows a single modal pore size distribution of the alumina membrane with a median pore size of 0.11 um and porosity of 31.1%. FIG. 3 shows the SEM surface morphology of alumina membrane. It can be seen that alumina particles are packed closely, giving rise to low porosity.

Example 2

Deposition of Porous Alumina Membranes with Use of a Spherical Pore Former

This example describes deposition of unsupported porous alumina membrane using different loadings of spherical acrylic emulsion particles as a pore former. Rhoplex™ B-85 acrylic emulsion from Rohm and Haas (now Dow Chemical Co.) was used in this example. The solution contained 38% acrylic particles. The majority of particles were about 60-70 nm in size, which is consistent with particle size analysis result shown by the line connecting the hollow triangles in FIG. 1.

Three alumina slurries were made containing 8 wt. % alumina and 20%, 40% and 60% of B-85 by volume by mixing alumina, Tiron, a B-85 solution and deionized. water. To make the slurry containing 40% pore former, 0.018 g of Tiron was dissolved in 67.3 g of deionized water, followed by the addition of 6 g of AKP30 alumina and 1.75 g of B-85 solution. After ball-milling overnight, the slurry was screened and degassed. The volume ratio of B-85 acrylic particles to alumina particles was 40:60.

Three unsupported alumina membranes were prepared with the three alumina slurries, respectively. The same procedure was used as in Example 1. The dried membranes were fired at the same temperature of 1150° C. for 2 h.

Figure 4:
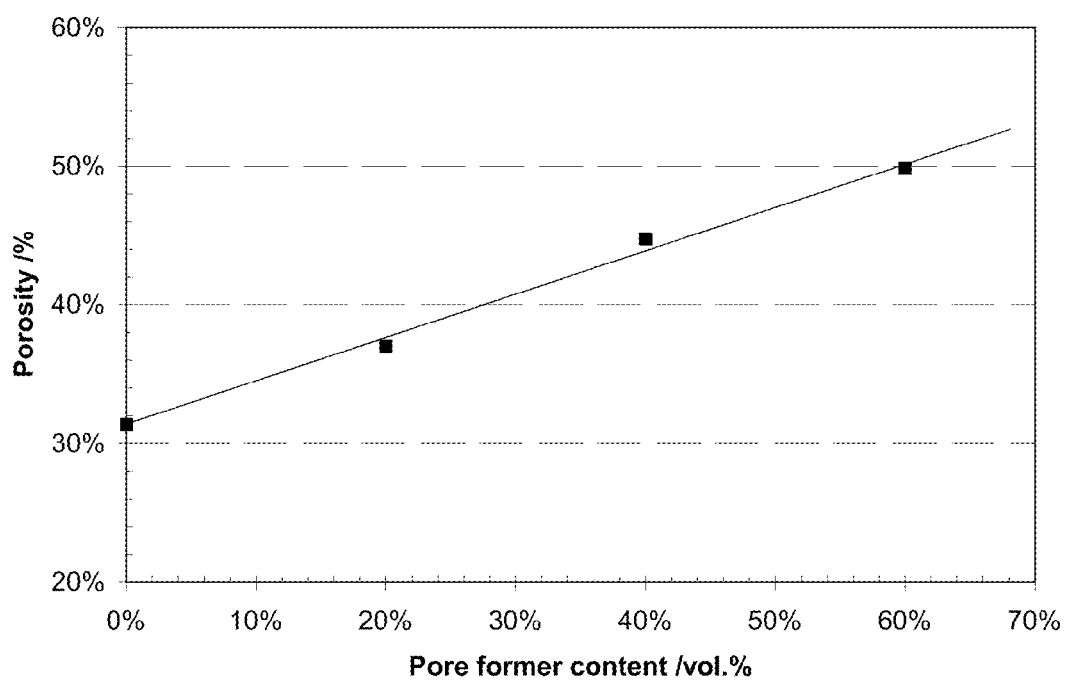
FIG. 4 is a graph showing the porosity of an alumina membrane as a function of the amount of a spherical pore former.

FIG. 4 shows the porosity as a function of pore former content. A linear increase in porosity was found with increasing pore former content. The porosity was increased from 31% to 50% when 60 vol. % B-85 was used as compared to the control.

Figure 5:
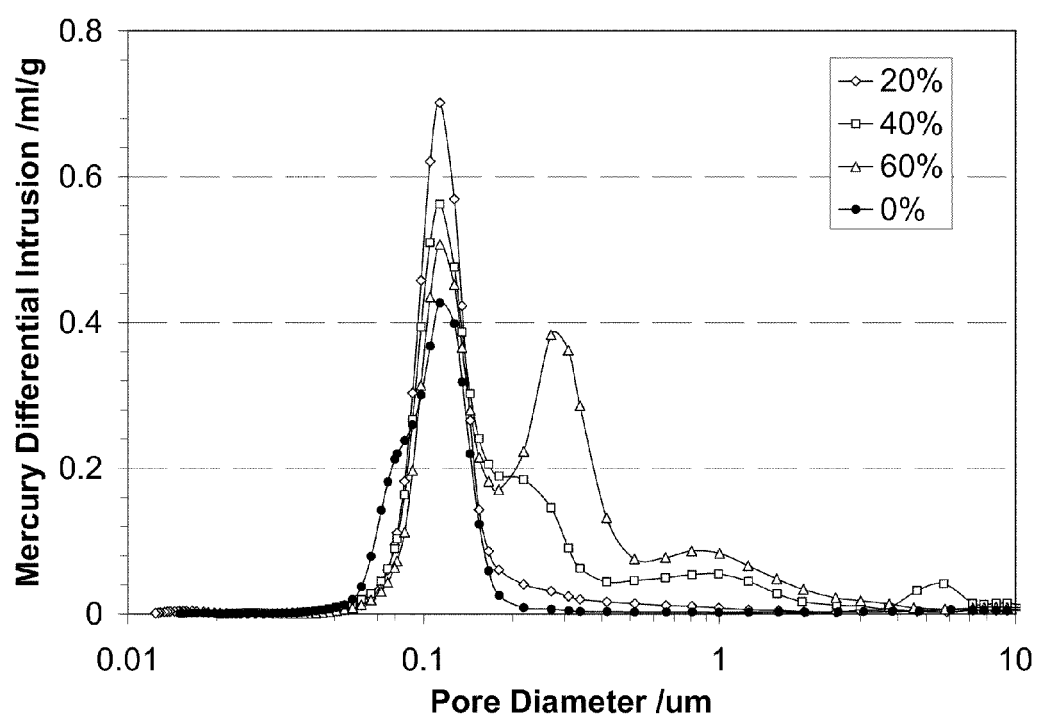
FIG. 5 is a graph showing the pore size distribution of alumina membranes made with and without a spherical pore former.

FIG. 5 compares the pore size distribution of the alumina membranes made with 0%, 20%, 40% and 60% pore former by volume. The membrane kept a single modal pore size distribution when 20% B-85 was used, however, the pore size distribution became bi-modal with addition of 40% or more. The value of (d90−d10)/d50 was 6.8 and 3.8 for the samples made with 40 vol % and 60 vol % of B-85, respectively.

Figure 6A:
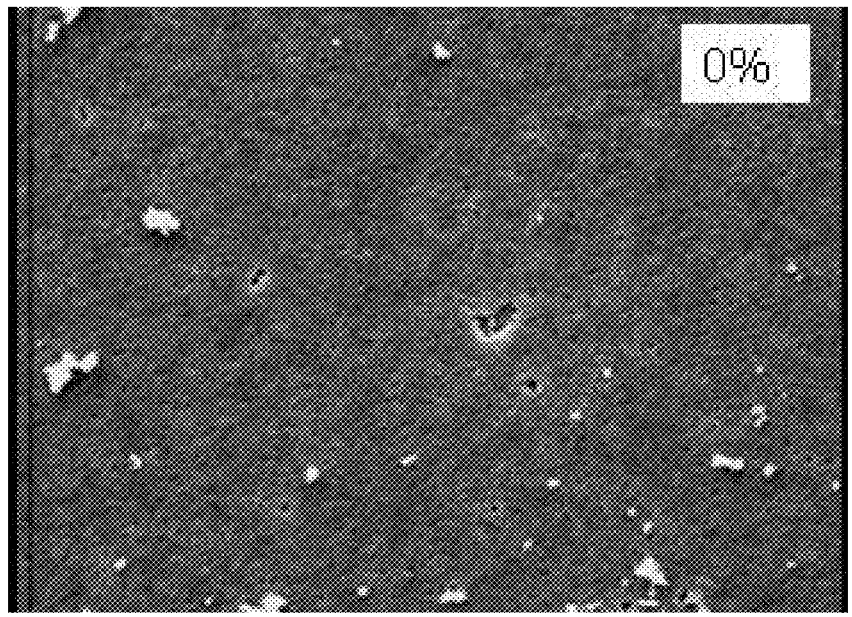
FIG. 6A is a scanning electron micrograph image of the surface morphology of an alumina membrane without the addition of a pore former.
Figure 6B:
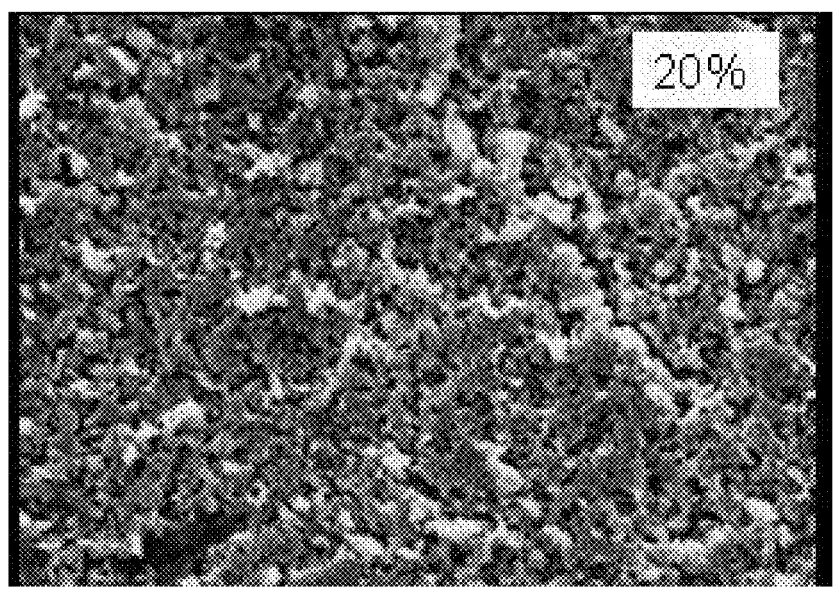
FIG. 6B is a scanning electron micrograph image of the surface morphology of an alumina membrane made with 20 vol % of a spherical pore former.
Figure 6C:
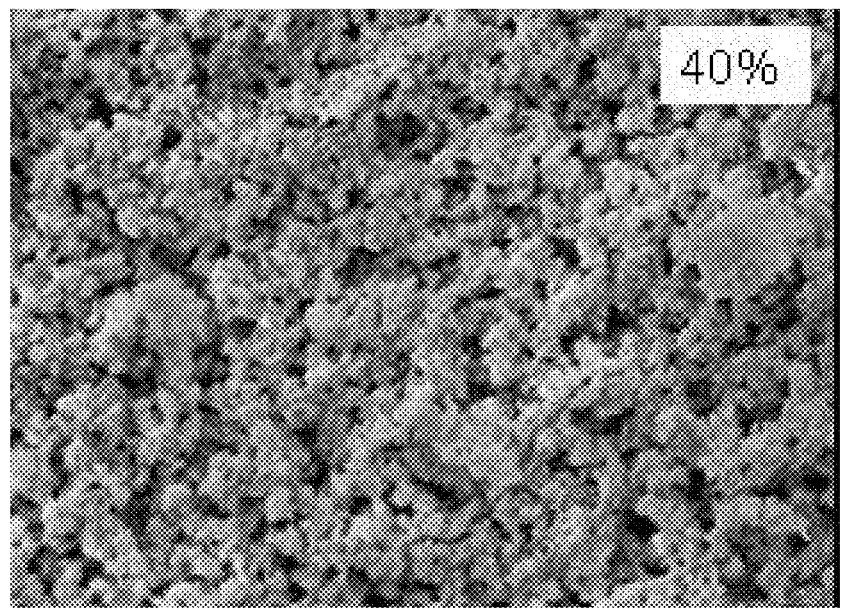
FIG. 6C is a scanning electron micrograph image of the surface morphology of an alumina membrane made with 40 vol % of a spherical pore former.
Figure 6D:
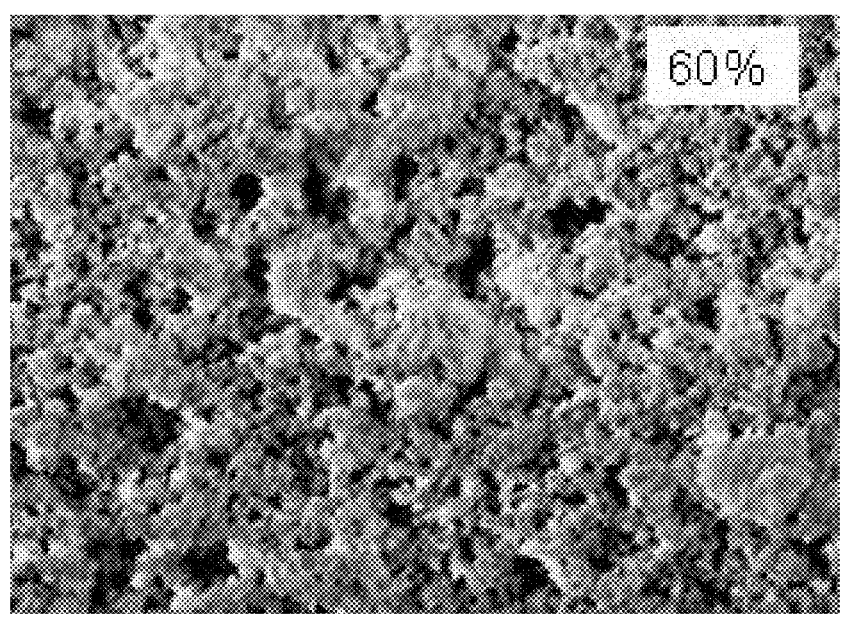
FIG. 6D is a scanning electron micrograph image of the surface morphology of an alumina membrane made with 60 vol % of a spherical pore former.

FIGS. 6A-6D compare SEM images of surface morphology of the alumina membranes made without (FIG. 6A) and with use of 20% (FIG. 6B), 40% (FIG. 6C), and 60% (FIG. 6D) by volume the pore former B-85. The alumina membranes appeared more porous with addition of the pore former, with large pores being observed when 40% or more B-85 was used (FIGS. 6C and 6D). This was consistent with Hg porosimetry data shown in FIG. 5.

Example 3

Deposition of Porous Alumina Membranes with Use of a Non-Spherical Pore Former This example describes deposition of unsupported porous alumina membrane made with a non-spherical pore former. Rhoplex™ Multilobe™ 400 acrylic binder from Rohm and Haas was used in this example. The solution control contained 53.0-54.0% solid. The majority of particles were about 300 nm in size, which is consistent with particle size analysis result shown by the line connecting the hollow squares in FIG. 1.

Three alumina slurries containing 8 wt. % alumina and 20%, 40% and 60% Multilobe™ 400 by volume were prepared. As an example, to make the slurry containing 40% pore former, 0.018 g of Tiron was dissolved in 68.2 g of deionized water, followed by the addition of 6 g of AKP30 alumina and 1.25 g of Multilobe™ 400 solution. After ball-milling overnight, the slurry was screened and degassed. The volume ratio of Multilobe™ 400 acrylic particles to alumina particles was 40:60.

Three unsupported alumina membranes were prepared with use of the three alumina slurries with the non-spherical pore former, respectively. The same procedure was used as in Example 1. The dried membranes were fired at the same temperature of 1150° C. for 2 h.

Figure 7:
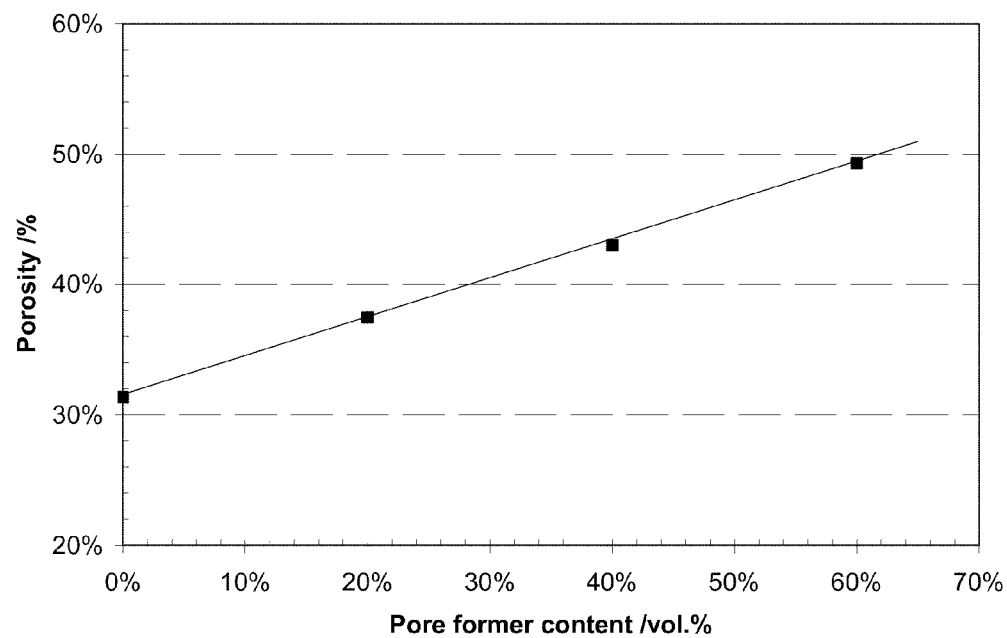
FIG. 7 is a graph showing the porosity of an alumina membrane as a function of the amount of a non-spherical pore former.

FIG. 7 shows the porosity as a function of pore former content. A linear increase in porosity was found with increasing pore former content. The porosity was increased from 31% to 49% when 60 vol. % of Multilobe™ 400 was used.

Figure 8:
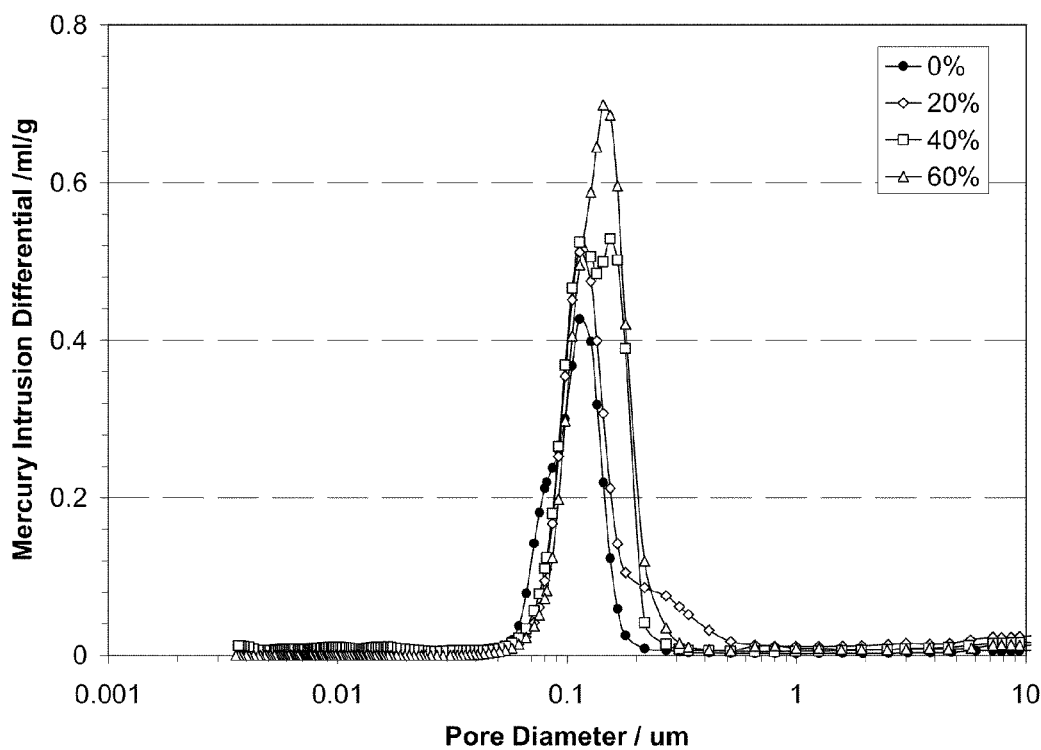
FIG. 8 is a graph showing the pore size distribution of alumina membranes made with and without a non-spherical pore former.
Figure 9A:
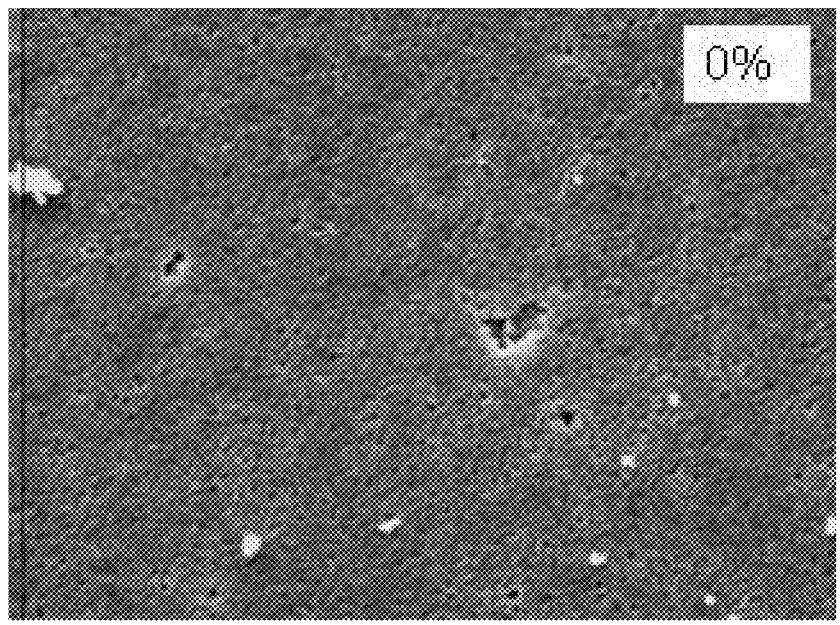
FIG. 9A is a scanning electron micrograph image of the surface morphology of an alumina membrane without the addition of a pore former.
Figure 9B:
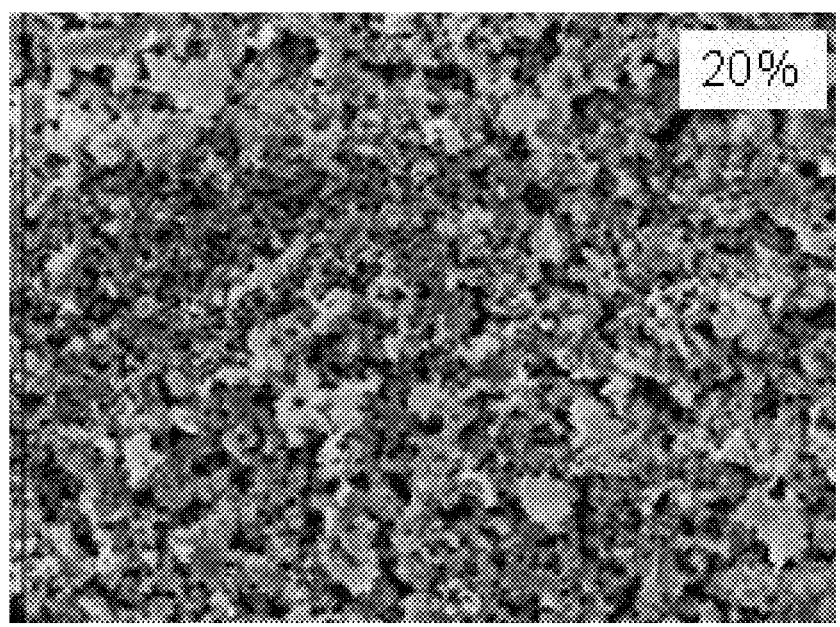
FIG. 9B is a scanning electron micrograph image of the surface morphology of an alumina membrane with made 20 vol % of a non-spherical pore former.
Figure 9C:
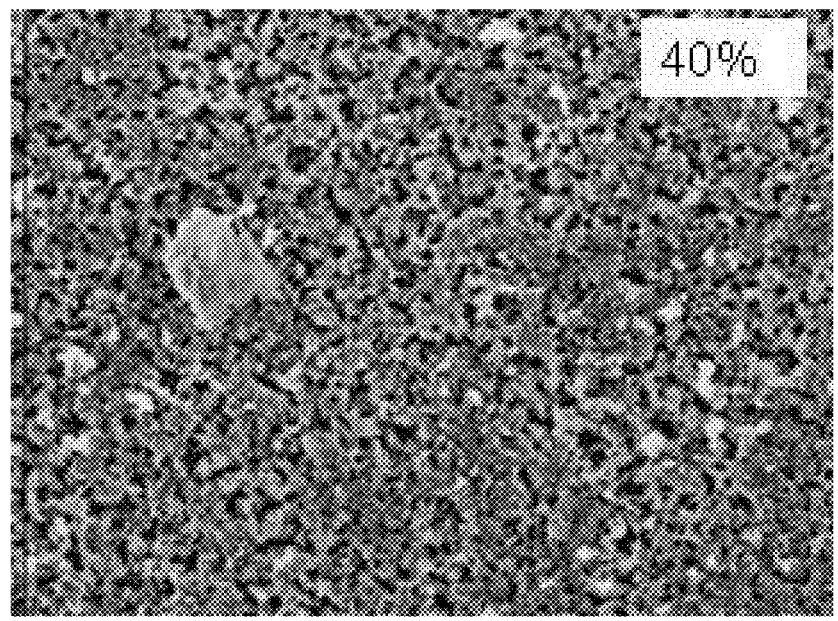
FIG. 9C is a scanning electron micrograph image of the surface morphology of an alumina membrane made with 40 vol % of a non-spherical pore former.
Figure 9D:
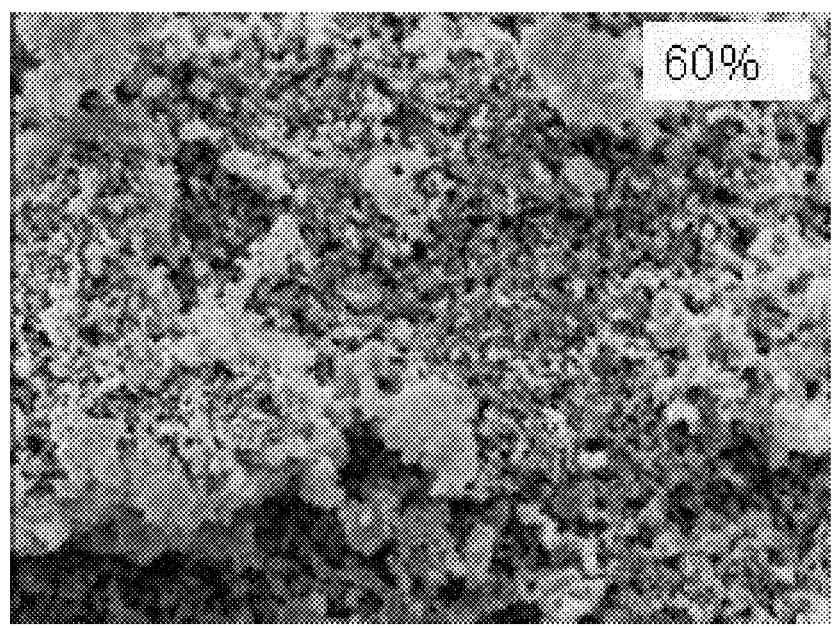
FIG. 9D is a scanning electron micrograph image of the surface morphology of an alumina membrane made with 60 vol % of a non-spherical pore former.

FIG. 8 compares the pore size distribution of the alumina membranes made with 0%, 20%, 40% and 60% non-spherical pore former by volume. Different from the membranes prepared with B-85, the membranes in this example kept a single modal pore size distribution when 60% pore former Multilobe™ 400 was used. The value of (d90–d10)/d50 was 0.81 for both the samples made with 40 vol % and 60 vol % of Multilobe™ 400.

FIGS. 9A-9D compare the SEM images of surface morphology of the alumina membranes made without (FIG. 9A) and with use of 20% (FIG. 9B), 40% (FIG. 9C), and 60% (FIG. 9D) by volume of the pore former Multilobe™ 400. Uniform surface morphology and pore size were found with high loading of the pore former. This is consistent with Hg porosimetry data shown in FIG. 8.

Example 4

Deposition of Porous Cordierite Membranes with Use of Another Pore Former

This example describes deposition of supported porous cordierite membrane using the same pore former as in Example 3, Rhoplex™ Multilobe™ 400 acrylic binder.

The honeycomb monolith support used in this example was made of cordierite with an outer diameter of 1 inch and a length of 2 inch comprising 125 rounded channels of an average diameter of 2 mm being uniformly distributed over the cross-sectional area. The support had a median pore size of 3.8 μm and porosity of 45.7%, as measured by mercury porosimetry. The support was flushed through the channels with deionized water, and was fully dried in a 120° C. oven overnight.

A cordierite slurry containing 15% by weight fine cordierite material and 40% Multilobe™ 400 by volume was prepared. The volume ratio of Multilobe™ 400 acrylic particles to cordierite particles is 40:60. The fine cordierite has a median particle size (d50) of 1.9 um. 0.18 g of Tiron was dissolved in 319.4 g of deionized water, followed by the addition of 33.45 g Multilobe™ 400 solution, 60 g of cordierite and 5.1 g of DC-B anti-foam emulsion solution (Dow-Corning). After ball-milling overnight, the slurry was screened and degassed.

The cordierite membrane was placed inside the channels of the support using a flow-coater that was disclosed in U.S. Published Patent Application 2008/0237919. The soaking time (contact time between the slurry and the support wall surface) was 20 seconds. After the slurry was discharged, the coated support was spun for 60 seconds at a speed of 525 rpm to remove excess cordierite slurry in the channels. The supported cordierite membrane was dried at 120° C. for 2 h under a $N_2$ flow with a humidity of 60%, although drying in a stagnant air may be an alternative. The dried membrane was fired at 1150° C. in air for 2 h at a heating rate of 1° C./min.

Figure 10A:
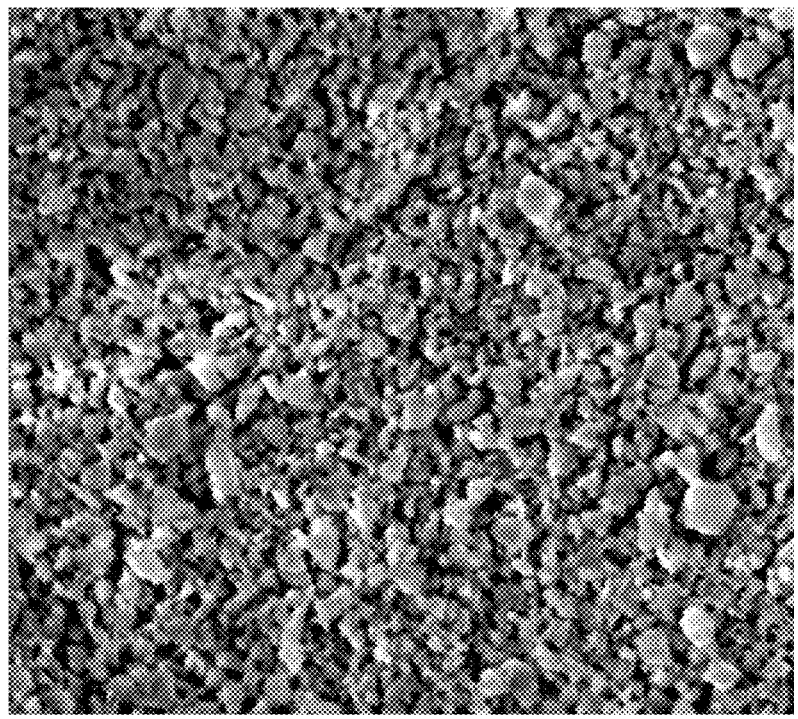
FIG. 10 A is scanning electron micrograph image of the surface morphology of a cordierite membrane with a non-spherical pore former.
FIG. 10B is a scanning electron micrograph image of the surface morphology of a cordierite membrane without a pore former.
Figure 10B:
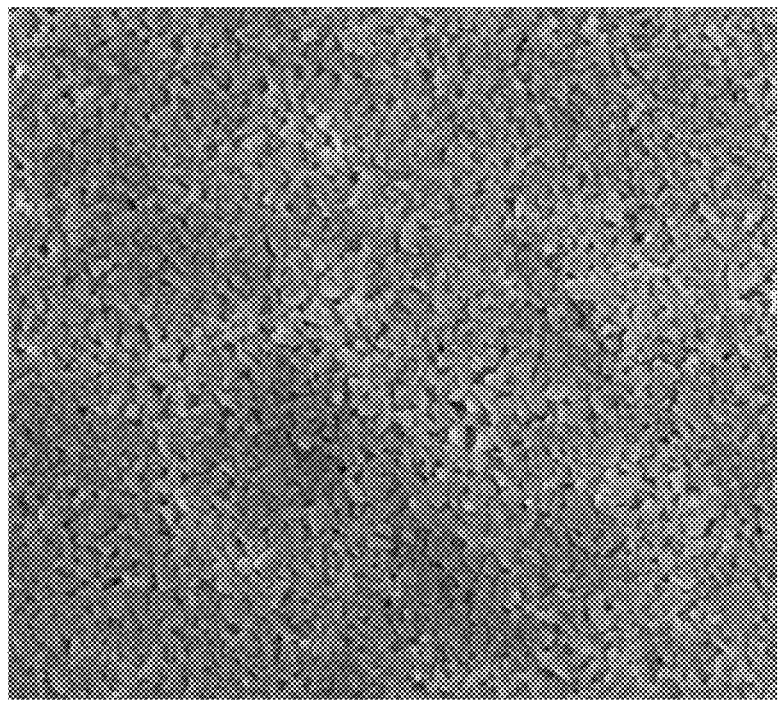

FIGS. 10A and 10B compare SEM images of the surface morphology of the resulted cordierite support with the cordierite membrane made of the same cordierite material but made with the pore former Multilobe™ 400 (FIG. 10A) and without the pore former (FIG. 10B). The surface of the membrane made with the pore former (FIG. 10A) appeared much more porous and the pores were very uniform.

The unsupported cordierite membrane was made with use of the same cordierite slurry for supported membrane. The same procedure was used as in Example 1. It was fired together with the supported membrane at 1150° C. for 2 h.

Figure 11:
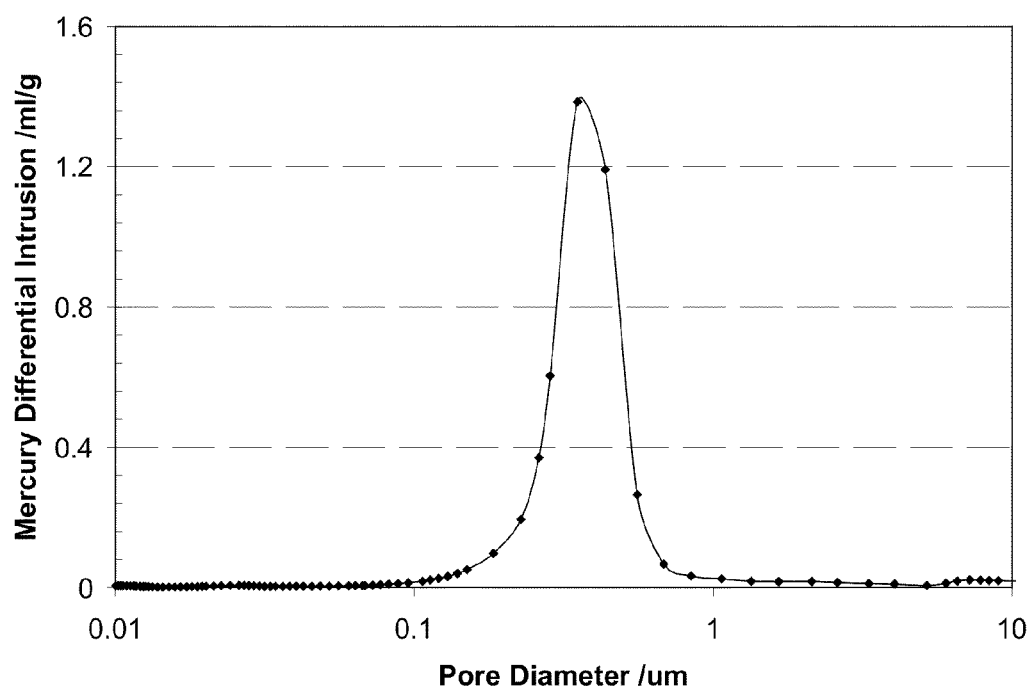
FIG. 11 is a graph showing the pore size distribution of a cordierite membrane with a non-spherical pore former.

FIG. 11 shows the pore size distribution of the cordierite membranes with Multilobe™ 400, as measured by Mercury porosimetry. The porosity was 48% and median pore size d50 was 0.38 um. The pore size distribution is narrow with the value of (d90–d10)/d50 of 0.77.

In one set of embodiments, a method is disclosed herein for making a porous inorganic membrane comprising the steps of mixing an inorganic material, an acrylic emulsion-organic polymer particles and a solvent to form a slurry, wherein the acrylic emulsion comprises acrylic particles, the particles being non-spherical; distributing the slurry onto a surface; drying the slurry to remove the solvent; and firing the dried slurry to produce the porous inorganic membrane. In some embodiments, the inorganic material comprises alumina, silica, zeolite, or combinations thereof. In some embodiments, the organic polymer particles comprise acrylic; in some of these embodiments, the acrylic emulsion comprises from about 20% to about 60% of the volume of the non-solvent materials in the slurry. In some embodiments, the surface is a porous support and the slurry is distributed on the porous support to form a coating on the porous support; in some of these embodiments, the porous support comprises a ceramic porous support. In some embodiments, the porous inorganic membrane has a thickness of from about 0.5 micron to about 30 microns. In some embodiments, the porous inorganic membrane has a thickness of from about 1 micron to about 10 microns. In some embodiments, the drying of the slurry comprises drying the slurry is dried at a temperature of from about 25° C. to about 120° C. In some embodiments, the drying of the slurry comprises drying the slurry is dried in an environment of air or N2 at a humidity of from about 60% to about 90%. In some embodiments, the dried slurry is fired for about 20 hours to about 45 hours at a temperature of about 1100° C. to about 1400° C. In some embodiments, the porous inorganic membrane has a porosity of from about 30% to about 55%. In some embodiments, the porous inorganic membrane has a pore size distribution as measured by mercury porosimetry comprising a mono-modal distribution wherein (d90–d10)/d50 is less than about 2 (wherein the pores having a size of d90 or less comprise about 90% of the total pore volume, the pores having a size of d50 or less comprise about 50% of the total pore volume and the pores having a size of d10 or less comprise about 10% of the total pore volume). In some embodiments, the solvent is an aqueous solvent.

In another aspect, a method is disclosed herein for producing a porous support with a porous inorganic coating comprising the steps of: mixing an inorganic material, an acrylic emulsion and a solvent to form a slurry, wherein the acrylic emulsion comprises acrylic particles, the particles being non-spherical; coating the porous support with the slurry; drying the slurry on the porous support to remove the solvent; and firing the dried slurry on the porous support to produce the porous support with the porous inorganic coating. In some embodiments, the inorganic material comprises alumina. In some embodiments, the porous inorganic membrane has a thickness of from about 0.5 micron to about 30 microns. In some embodiments, the porous inorganic membrane has a thickness of from about 1 micron to about 10 microns. In some embodiments, the acrylic emulsion comprises from about 20% to about 60% of the volume of the non-solvent materials in the slurry. In some embodiments, the porous support is in the form of a honeycomb monolith. In some embodiments, the porous support comprises a ceramic comprising cordierite, alpha-alumina, mullite, aluminum titanate, titania, zirconia, ceria or combinations thereof. In some embodiments, the slurry further comprises a dispersant, a binder, an anti-cracking agent, an anti-foaming agent, or combinations thereof. A porous support with a porous inorganic coating produced by this method is also disclosed herein; in some embodiments, the porous inorganic coating comprises a porosity of from about 30% to about 65% with a median pore size of from about 0.01 micron to about 10 microns; in some embodiments, the porous inorganic membrane has a pore size distribution as measured by mercury porosimetry comprising a mono-modal distribution wherein (d90–d10)/d50 is less than about 2 and the pores having a size of d90 or less comprise about 90% of the total pore volume, the pores having a size of d50 or less comprise about 50% of the total pore volume and the pores having a size of d10 or less comprise about 10% of the total pore volume.

In another aspect, a substrate with a porous inorganic membrane disposed on the substrate is disclosed herein, the inorganic membrane having an average thickness of from about 0.5 micron to about 30 microns, and in some embodiments from about 1 micron to about 10 microns, a porosity of from about 30% to about 65%, a median pore size (d50) of from about 0.01 micron to about 1 micron, and a value of (d90–d10)/d50 less than about 2, as measured by mercury porosimetry. In some embodiments, the substrate is an inorganic porous support.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making a porous inorganic filtration membrane comprising the steps of:

mixing an inorganic material, multi-lobed organic polymer particles and a solvent to form a slurry, wherein the multi-lobed organic polymer particles comprise 40% or more of the volume of non-solvent materials in the slurry;

distributing the slurry onto a surface;

drying the slurry to remove the solvent; and firing the dried slurry to produce the porous inorganic membrane, wherein lobes from the multi-lobed organic polymer particles are in contact with each other such that, after the firing, pores formed by the multi-lobed organic polymer particles are connected together.

2. A method for making a single modal porous inorganic filtration membrane comprising the steps of:

mixing an inorganic material, multi-lobed organic polymer particles and a solvent to form a slurry, wherein the multi-lobed organic polymer particles comprise 40% or more of the volume of non-solvent materials in the slurry;

distributing the slurry onto a surface;

drying the slurry to remove the solvent; and firing the dried slurry to produce the porous inorganic membrane, wherein the porous inorganic membrane comprises a single modal pore size distribution; and wherein lobes from the multi-lobed organic polymer particles are in contact with each other such that, after the firing, pores formed by the multi-lobed organic polymer particles are connected together.

3. The method of claim 2 wherein the inorganic material comprises alumina, silica, zeolite, or combinations thereof.

4. The method of claim 2 wherein the organic polymer particles comprise acrylic.

5. The method of claim 4 wherein the acrylic comprises from 40% to about 60% of the volume of the non-solvent materials in the slurry.

6. The method of claim 2 wherein the surface is a porous support and the slurry is distributed on the porous support to form a coating on the porous support.

7. The method of claim 6 wherein the porous support comprises a ceramic porous support.

8. The method of claim 2 wherein the porous inorganic membrane has a thickness of from about 1 micron to about 10 microns.

9. The method of claim 2 wherein the drying of the slurry comprises drying the slurry at a temperature of from about 25° C. to about 120° C.

10. The method of claim 9 wherein the drying of the slurry comprises drying the slurry in an environment of air or N2 at a humidity of from about 60% to about 90%.

11. The method of claim 2 wherein the dried slurry is fired for about 20 hours to about 45 hours at a temperature of about 1100° C. to about 1400° C.

12. The method of claim 2 wherein the porous inorganic membrane has a porosity of from about 40% to about 55%.

13. The method of claim 2 wherein the porous inorganic membrane has a pore size distribution as measured by mercury porosimetry comprising a mono-modal distribution wherein (d90–d10)/d50 is less than about 2 and the pores having a size of d90 or less comprise about 90% of the total pore volume, the pores having a size of d50 or less comprise about 50% of the total pore volume and the pores having a size of d10 or less comprise about 10% of the total pore volume.

14. The method of claim 2 wherein the solvent is an aqueous solvent.

15. A method for producing a porous support with a single modal porous inorganic filtration coating comprising the steps of:
mixing an inorganic material, an acrylic emulsion and a solvent to form a slurry, wherein the acrylic emulsion comprises multi-lobed acrylic particles and the multi-lobed acrylic particles comprise 40% or more of the volume of non-solvent materials in the slurry;
coating the porous support with the slurry;
drying the slurry on the porous support to remove the solvent; and
firing the dried slurry on the porous support to produce the porous support with the porous inorganic coating,
wherein the porous inorganic coating comprises a single modal pore size distribution; and
wherein lobes from the multi-lobed acrylic particles are in contact with each other such that, after the firing, pores formed by the multi-lobed acrylic particles are connected together.

16. The method of claim 15 wherein the inorganic material comprises alumina.

17. The method of claim 15 wherein the porous inorganic membrane has a thickness of from about 1 micron to about 10 microns.

18. The method of claim 15 wherein the acrylic emulsion comprises from 40% to about 60% of the volume of the non-solvent materials in the slurry.

19. The method of claim 15 wherein the porous support is in the form of a honeycomb monolith.

20. The method of claim 15 wherein the porous support comprises a ceramic comprising cordierite, alpha-alumina, mullite, aluminum titinate, titania, zirconia, ceria or combinations thereof.

21. The method of claim 15 wherein the slurry further comprises a dispersant, a binder, an anti-cracking agent, an anti-foaming agent, or combinations thereof.

* * * * *